April 20, 1948.                J. OLCOTT ET AL                2,440,059
                               FLUID FLOW REGULATOR
                               Filed Sept. 16, 1943              2 Sheets-Sheet 1

Inventors
James Olcott,
Allan C. Hoffman,
By C. B. Stevens
Attorney

April 20, 1948.  J. OLCOTT ET AL  2,440,059
FLUID FLOW REGULATOR
Filed Sept. 16, 1943  2 Sheets-Sheet 2
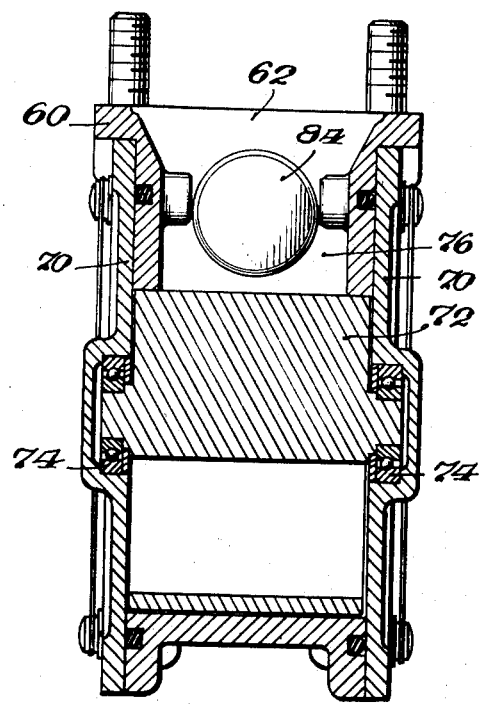
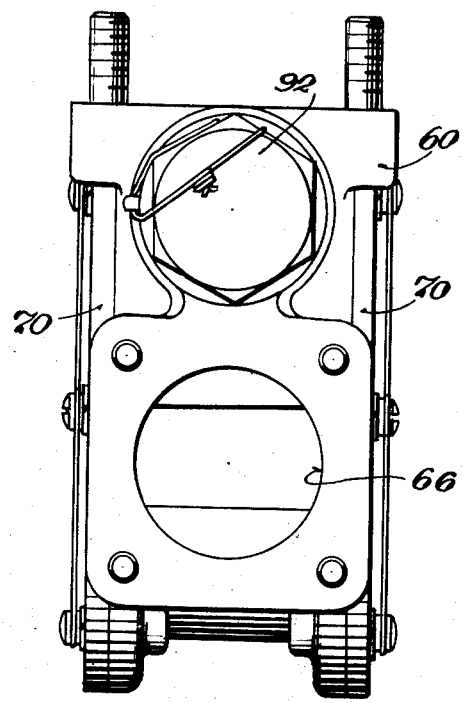
Inventors
James Olcott,
Allan C Hoffman,
By C B Stevens
Attorney Patented Apr. 20, 1948

2,440,059

UNITED STATES PATENT OFFICE 2,440,059

FLUID FLOW REGULATOR

James Olcott and Allan C. Hoffman, Dayton, Ohio, assignors to United Aircraft Products, Inc., Dayton, Ohio, a corporation of Ohio Application September 16, 1943, Serial No. 502,682

5 Claims. (Cl. 137—166)

This invention relates to a fluid flow regulator, more particularly to a device for controlling and dividing the flow of a congealable liquid, such as a lubricant, prior to its passage toward and through one or more congealable liquid conditioning devices or heat exchangers forming a part of the lubricating system of certain types of power plants, although it will be readily apparent that the device of the invention is not restricted to such use.

The invention has special application in connection with oil coolers or heat exchangers of airplane engines, which are subjected to extreme and sudden changes of temperature. These changes are particularly detrimental if they cause overcooling and consequent blocking of the lubricating system.

One of the important objects of the invention is to provide a device of the above character for use in a lubricating system having a plurality of separate oil coolers or heat exchangers therein, which device includes an automatically variable regulating valve for dividing the lubricant flowing from a suitable source, such as the sump pump of an engine so that each conditioner when operating under normal circumstances will receive a like amount of liquid. A feature of the operation of the device according to this object is that should the oil in one of the conditioners tend to become congealed the valve device will function automatically to concentrate the pressure of the flowing oil towards such congealed conditioner—pressure relief means being provided for maintaining the pressure applied to the congealed conditioner at a predetermined high level without however interrupting flow through the system.

A particular object of the invention is to utilize the dynamic and static pressure characteristics of a flowing liquid to control motion of a distributing valve, the functions of which are continuously variable in response to the flow of liquid therethrough.

In carrying out these objects there has been provided a fluid flow regulator comprising a body within which a moving element or rotor is provided having oppositely disposed curved surfaces to divide the oil flow from a single inlet to a pair of parallel outlets and which are subjected to force components set up by the centrifugal action of the oil. As long as the oil conditioners, to which the oil flows from the valve outlets, are open for the free passage of oil therethrough, the mass, weight and velocity of the oil streams acting on the separate curved surfaces of the rotor are substantially equal and the rotor accordingly is in a state of equilibrium. However, should one of the oil streams encounter a greater than normal resistance, the oil entering the fluid regulator tends to flow in greater volume through the relatively unrestricted passage, with the result that there is an unbalancing of the opposed forces acting on the rotor and a consequent motion of the rotor in the direction of the resulting torque. The arrangement of the rotor and of the flow passages are such that movement of the unbalanced rotor is effected in a manner to divert an increased amount or all of the oil flow to the restricted passage thereby exerting a pressure for the removal of the restriction. Pressure relief means act to limit the application of pressure to the restricted passage, such relief means being part of a by-pass around the rotor in order that flow through the valve may be continuous.

Other objects and structural details of the invention will appear from the following description when read in connection with the accompany drawings wherein:

Fig. 3 is a view in cross section taken along the line 3—3 of Fig. 2, and

Fig. 4 is a view of the fluid flow regulator in end elevation.

Figure 1:
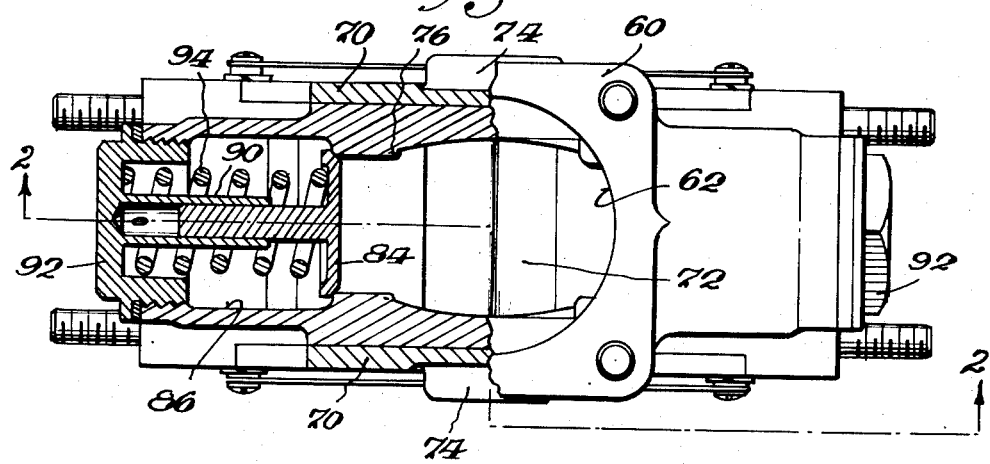
Fig. 1 is a plan view of the fluid flow regulator of the invention, part of the housing or body being broken away to show the pressure relief mechanism.
Figure 2:
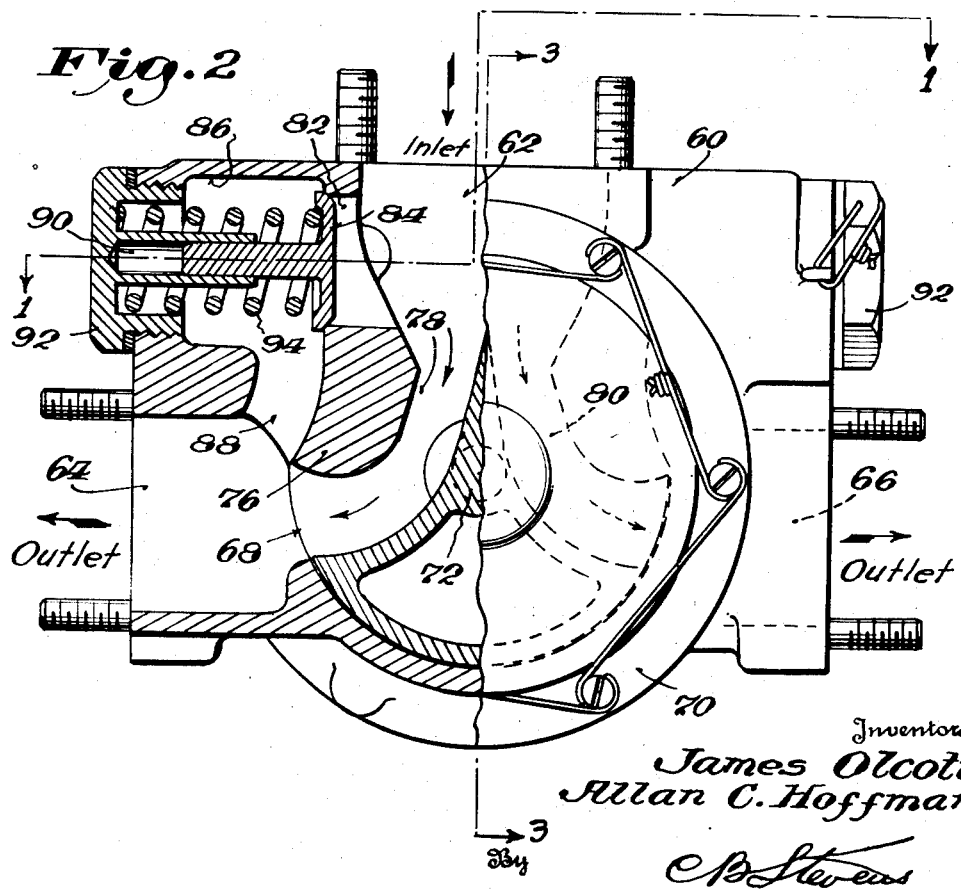
Fig. 2 is a view partly in vertical section and partly in side elevation of the regulator of Fig. 1, being taken along the irregular line 2—2 of Fig. 1.

Referring to the drawings, the fluid flow regulator comprises a body portion 60 adapted to be disposed in a fluid flowing system wherein the single inlet opening thereof receives fluid from a sump pump or the like and the pair of parallel outlets thereof are connected to respective congealable liquid conditioning devices or oil coolers. The body 60 is of generally rectangular shape and is formed with a side opening 62 constituting the inlet and with oppositely disposed end openings 64 and 66 constituting outlets communicating with the respective conditioners. A transverse bore 68 in the body portion 60 establishes communication between all of the openings 62, 64 and 66, the ends of the bore 68 being closed by plates 70. Disposed lengthwise within the bore 68 is the flow divider or rotor 72, mounted in bearings 74 in the plates 70. Referring particularly to Fig. 2, the rotor 72 may be described as having in cross section a shape resembling a triangle, with the base thereof convexly curved to conform to the bore 68 and with the sides thereof inwardly curved as concavities for the gradual turning aside of the oil from the inlet to the outlets. The apex portion of the rotor is directed toward the inlet and may be disposed so as to divide the oil entering the bore 68 into two streams, the separate streams varying in volume, or proportion, as rotary motion of the rotor increases the flow area on one side of the apex and reduces the flow area on the other side thereof. Projecting into the bore 68 on each side of the inlet 62 is an internal body rib 76 (one shown), the respective ribs defining, in cooperation with the sides of the rotor, flow paths 78 and 80 for the separate oil streams. As shown, the flow paths 78 and 80 register at their delivery ends with respective outlets 64 and 66 and are arranged, by reason of the curvature of the rotor and the ribs 76, to divert oil streams smoothly and gradually from a path transverse to the longitudinal axis of the body into a path parallel thereto. In so moving, the oil exerts a centrifugal action on the passage wall defined by the rotor 72 in a manner tending to turn the rotor. The passages 78 and 80 are similar in size and contour and, with the rotor 72 positioned with its apex approximately centered opposite the inlet 62, the volume and rate of flow of the oil streams in the respective passages tend to equalize. This being so, the force components acting on the opposite sides of the rotor are the same and will balance one another, with the result that the rotor assumes a condition of equilibrium wherein its only function is to divide the main oil flow, diverting one stream to one conditioner and another stream to the other conditioner. Such position of the parts and mode of operation is maintained until the normal resistance to flow encountered by the streams is made unequal as the result of the presence of congealed oil or other restriction in the passages associated with one of the conditioners. As reflected in the flow divider unit, a variance in the resistance to flow imposed on the separate streams serves to interrupt the equal distribution of the oil into the passages 78 and 80, less oil being admitted to the restricted passage and correspondingly more oil being forced through the unrestricted passage. Inequality of flow brings about an unbalancing of the centrifugal forces acting on the rotor, and the rotor is caused to turn in the direction of the resultant torque.

If, by way of example, the oil in the conditioner associated with outlet 64 is congealed, the flow restriction reacts in the communicating passages extending back to the passage 78 in the body 60, and a reduction in flow takes place in this passage as the oil follows the path of least resistance and flows in increased proportion through the passage 80. Accompanying the greater oil flow in passage 80 is a higher centrifugal force urging the rotor 72 in a clockwise direction (as viewed in Fig. 2). In response to such urging the rotor turns, causing the apex portion thereof to approach the right hand rib 76 and partly or fully close the passage 80. The oil is the restricted passage thereby is subjected to a forced application of a large part or all of the pump pressure, and, as the pressure rises, the source of the restriction is expelled. As freedom of flow is again established the rotor returns to the balanced state illustrated, in which the oil is directed equally to the pair of conditioners.

In the fluid flow regulator there is embodied pressure relief mechanism operating to prevent the attainment of an undesirably high pressure in the body portion. Formed in each rib 76 just inside the inlet 62 is an opening 82 normally closed by a valve 84. The valve 84 is disposed in a chamber 84 or 66, and when open permits a flow of oil from the inlet to the outlet in by-passing relationship to the passages 78 and 80. The stem of the valve 84 is guided in a bushing 90 integral with a cap 92 closing the chamber 86. A compression spring 94 is interposed between the cap 92 and valve 84 and presses the valve to a seated or a closed position with respect to the opening 82. The valves 84 preferably are disposed just above the passages 78 and 80 and are exposed to the pressure of the oil there, which pressure tends to force the valves open. The springs 94 are of such strength as to hold the valves closed during all normal operating pressure but to yield to a predetermined high pressure as may develop from blocking of the flow passages. When, as in the example previously given, the rotor 72 turns to shut off passage 80 and permits a "blowing out" of passage 78 and communicating areas, the oil flow is sharply reduced until the restriction is cleared away. The pressure, rising rapidly at the inlet 62, may not immediately function to remove the restriction, and in this event, since it is undesirable to interrupt the flow for relatively long periods, the valves 84 open to permit the oil to pass directly to the outlets 64 and 66. The outlet 66 and communicating areas being open the circuit is reestablished, temporarily using only one of the pair of conditioners.

We claim:

1. In a fluid flow divider, a casing having an inlet and a pair of outlets, separator means in said casing movable in opposite directions for selectively closing one or the other of the outlets, respectively, and having an intermediate position in which said outlets are open, pressure responsive means in said outlets connected to said separator means for moving the latter in response to an increase in the dynamic pressure of the fluid flowing through one outlet over that of the fluid flowing through the other outlet to a position closing the outlet from which flows the fluid of greater dynamic pressure, and means for by-passing fluid around said separator to the outlet closed by said separator when the pressure at said inlet rises to a predetermined value.

2. A fluid flow regulator adapted to be interposed in a system circulating fluid under pressure from a pressure fluid source through parallel circuits each imposing a variable resistance to the flow of fluid, said regulator being constructed to divide a single stream into a plurality of streams and comprising a flow divider and means responsive to a change in the relative pressures resulting from a change in the relative resistances imposed on said separate streams for moving said divider toward a position blocking the flow of the separate stream of lesser resistance, whereby a larger proportion of the fluid flow is diverted to the stream of greater resistance with a consequent rise in pressure therein, and means for causing a by-pass flow of fluid around said divider to said stream of lesser resistance when the pressure of said stream of greater resistance exceeds a predetermined value.

3. A fluid flow regulator adapted to be interposed in a system circulating fluid under pressure from a pressure fluid source through two parallel circuits each imposing a variable resistance to the flow of fluid, said regulator comprising a body having an inlet and a pair of outlets, a flow divider in said body arranged to separate the fluid entering said inlet into two streams discharged from the body by way of the respective outlets, said divider being movable to vary the proportions of said streams, means responsive to a change in the relative rates of flow between said streams for moving said divider toward a position blocking the stream having the higher rate of flow, whereby a larger proportion of the fluid flow is diverted to the stream having the lesser rate of flow and the pressure therein caused to rise, individual by-passes connecting said inlet to said outlets, and pressure responsive valves controlling the flow through said by-passes, said valves opening when the fluid pressure at the inlet exceeds a predetermined value.

4. A fluid flow regulator adapted to be interposed in a system circulating fluid under pressure through a pair of fluid conditioners, comprising a body portion having an inlet and a pair of outlets, the fluid entering said body by way of said inlet and leaving said body in separate streams by way of said outlets, the rate of flow from said outlets being variable by the presence of relatively greater and lesser back pressure at the respective outlets, means responsive to differences in the rates of flow of said streams for effecting a part or complete shutting off of the stream of higher flow thereby to raise the pressure of the fluid in the stream leading to the outlet of greater back pressure, and pressure relief mechanism operating upon the attainment of a predetermined pressure in the body to open the flow from the body inlet to the outlet of lesser back pressure.

5. A fluid flow regulator according to claim 4, characterized in that said pressure relief mechanism comprises passages connecting said inlet to said outlets in by-passing relationship to said flow responsive means, and pressure responsive valves controlling the flow through said passages.

JAMES OLCOTT.
ALLAN C. HOFFMAN.

REFERENCES CITED

The following references are of record in the file of this patent:

UNITED STATES PATENTS

| Number | Name | Date |
|---|---|---|
| 1,465,172 | Parsons | Aug. 14, 1923 |
| 1,905,733 | Moore | Apr. 25, 1933 |
| 1,993,790 | Kinsella | Mar. 12, 1935 |
| 1,999,834 | Ernst | Apr. 30, 1935 |
| 2,242,002 | Klein | May 13, 1941 |